(12) United States Patent
Tay et al.

(10) Patent No.: US 11,366,958 B1
(45) Date of Patent: Jun. 21, 2022

(54) INTELLIGENT AUTOMATED NOTE ANNOTATION

(71) Applicant: Dell Products L.P., Round Rock, TX (US)

(72) Inventors: Benedict Tiong Chee Tay, Singapore (SG); Mark John Law, Singapore (SG); Jonathan Sebastian Yarborough Wood, Singapore (SG); Chin Leong Ong, Singapore (SG); Michiel Sebastiaan Emanuel Petrus Knoppert, Amsterdam (NL); Ye Chang Ron Tan, Singapore (SG)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/175,402

(22) Filed: Feb. 12, 2021

(51) Int. Cl.
*G06F 40/169* (2020.01)
*G06F 3/04883* (2022.01)
*G06F 40/117* (2020.01)
*G06T 11/00* (2006.01)
*G06F 16/33* (2019.01)
*G06F 16/955* (2019.01)
*G06F 9/54* (2006.01)
*G06F 16/338* (2019.01)
*G06F 16/31* (2019.01)

(52) U.S. Cl.
CPC ........ *G06F 40/169* (2020.01); *G06F 3/04883* (2013.01); *G06F 9/54* (2013.01); *G06F 16/31* (2019.01); *G06F 16/338* (2019.01); *G06F 16/3344* (2019.01); *G06F 16/9558* (2019.01); *G06F 40/117* (2020.01); *G06T 11/00* (2013.01)

(58) Field of Classification Search
CPC ... G06F 40/169; G06F 16/338; G06F 3/04883
See application file for complete search history.

(56) References Cited

U.S. PATENT DOCUMENTS

| | | | | |
|---|---|---|---|---|
| 8,799,401 | B1* | 8/2014 | Bryar | G06F 16/5846 709/217 |
| 2010/0262591 | A1* | 10/2010 | Lee | G06F 3/04842 707/706 |
| 2011/0043652 | A1* | 2/2011 | King | G06F 40/194 348/222.1 |
| 2014/0019905 | A1* | 1/2014 | Kim | G06F 3/04883 715/780 |
| 2014/0250143 | A1* | 9/2014 | Dai | G06K 9/222 707/769 |
| 2017/0068854 | A1* | 3/2017 | Markiewicz | G06F 3/04883 |

* cited by examiner

*Primary Examiner* — Asher D Kells
(74) *Attorney, Agent, or Firm* — Norton Rose Fulbright US LLP (57) ABSTRACT

An information handling system may detect handwritten text associated with a gesture. The information handling system may request contextual information corresponding to the handwritten text and may receive contextual information corresponding to the handwritten text. The information handling system may display, on a display of the information handling system, the received contextual information.

20 Claims, 4 Drawing Sheets

INTELLIGENT AUTOMATED NOTE ANNOTATION

FIELD OF THE DISCLOSURE

The present disclosure generally relates to information handling systems, and more particularly relates to automatic retrieval of contextual information for handwritten notes.

BACKGROUND

As the value and use of information increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

Information handling systems may be used in a variety of settings. Such settings may include the workplace, the classroom, the home, and other settings. For example, some information handling systems may be used for note-taking in meetings, classes, or personal use. Many information handling systems include input interfaces to facilitate note-taking, such as keyboards, physical and/or touch screen. Some information handling systems may allow a user to take handwritten notes on displays of the information handling systems. For example, a special-purpose stylus or pen may be used to take notes on a display of a smart phone or tablet. Alternatively or additionally, information handling systems may allow users to take handwritten notes using a finger on their displays. Interfaces that allow users to take handwritten notes may allow a user greater flexibility in note-taking, enhancing a user experience. Note-taking may be particularly useful in academic and workplace and academic settings where users may wish to record details and observations from lectures and/or meetings. Handwritten notes, however, may often lack contextual information, reducing the utility of such notes.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

An information handling system may aggregate and display contextual information associated with handwritten text input by a user to provide a user with information that relates to the handwritten text. For example, an information handling system may retrieve information associated with handwritten text entered by a user from a plurality of sources via a plurality of APIs, and may display an overlay of the contextual information near the handwritten text. Such contextual information may, for example, be files tagged with tags that correspond to the handwritten text, files with file names that correspond to the handwritten text, information about an individual that corresponds to the handwritten text, and other information. Thus, the information handling system may retrieve contextual information from a variety of sources and may display the retrieved information near the handwritten text. Such information aggregation and display may enhance the utility of a note taking application, providing a user with valuable information associated with the handwritten text.

An example method for providing contextual information to a user of an information handling system may begin with detecting, by the information handling system, handwritten text associated with a gesture. For example, the information handling system may detect a gesture and may also detect handwritten text to which the gesture applies. The gesture may correspond to an information request. Such a gesture may include entry of a predetermined character or plurality of characters, an underlining or double underlining touch entry, a double tap touch entry, or other gesture to indicate that contextual information related to handwritten text should be retrieved. The information handling system may detect handwritten text that is associated with the gesture. For example, a user may write a name or term and may double tap, underline, or otherwise select the handwritten name or term for contextual information retrieval. In some embodiments, detection of the gesture and handwritten text may be performed by an application of the information handling system, such as a note taking or document production application.

The information handling system may request contextual information corresponding to the handwritten text. Such information may be requested from the information handling system on which the handwritten text was detected or from one or more external information handling systems. For example, the information handling system may transmit a request for the contextual information to a back end service that may query one or more application programming interfaces (APIs) for internal enterprise or external services for contextual information related to the handwritten text. For example, if a user writes a name of an individual and inputs a gesture indicating that contextual information related to the name should be retrieved, the information handling system may communicate with an internal enterprise database having information on employees of an organization to request contextual information related to the name. For example, one or more emails generated by or received by the named individual, messaging conversations generated or received by the named individual, documents generated or edited by the individual, or a corporate profile of the individual may be requested and received. As another example, if the handwritten text includes a term, a request may be made to an external service to retrieve titles and/or locations of documents including and/or tagged with the handwritten term. In some embodiments, if the handwritten text includes a term, a request may be made for a lexical search to be performed on the term. A backend service may request that one or more third party services return information matching the key word, such as documents tagged with the term or including the term in the title, emails tagged with the term, project database entries tagged with the term, and other files otherwise including the term. In some embodiments, if the handwritten text includes a term, a request may be made for a semantic search to be performed on the term. The information handling system may request that a backend service perform or request that one or more third party services perform a semantic search based on a meaning of the term using a semantic engine. Contextual information requested and returned in response to a detected term may include one or more links to one or more documents stored in a database that are tagged with the term, one or more links to one or more web documents that are tagged with the term, one or more links to one or more web pages that are tagged with the term, contextual information describing one or more individuals tagged as experts or collaborators with expertise in the term, one or more links to one or more messaging conversations, such as Skype conversations, Slack conversations, Teams conversations, and other messaging conversations, tagged with the term, or other contextual information associated with the term. Thus, files, documents, and other information not including the term itself may be returned. As another example, if the handwritten text includes a date, a request may be made for contextual information relating to files, such as emails, documents, and other files, generated on or altered on the handwritten date. As another example, if the handwritten text includes a time frame, such as "last week," a request may be made for contextual information relating to files associated with the time frame. In some embodiments, requesting of contextual information corresponding to the handwritten text may be performed by a background service executed by the information handling system.

The information handling system may then receive contextual information corresponding to the handwritten text from the one or more external information handling systems. For example, one or more APIs from which information is requested may return contextual information corresponding to the handwritten text. If contextual information is requested for a name of an individual, for example, information including a photo of the individual, a location of the individual, an organizational position of the individual, and other information relating to the individual may be returned. As another example, documents created by the individual or tagging the individual may also be returned. As a further example, contextual information extracted from one or more emails sent by or received by the named individual may be returned. If contextual information related to a handwritten term was requested, names, locations, such as links, and other details, of documents tagged with and/or including the term may be returned. If contextual information related to a handwritten date was requested, contextual information, such as links, titles, and other contextual information, relating to files, such as emails, documents, and other files, generated on or altered on the handwritten date may be returned. Contextual information may, for example be received by a backend service from a plurality of sources and may be transmitted from the backend service to the information handling system.

The information handling system may then display, on a display of the information handling system, the received contextual information. For example, the contextual information may be overlaid or shown in a pop up on a note taking or document production application window in which the handwritten text was detected and is displayed.

In some embodiments, a plurality of rankings for a plurality of contextual information elements of the contextual information may be received by the information handling system. For example, a back end service operated by a remote server may receive the request for contextual information and may retrieve contextual information via one or more APIs. The back end service may then rank contextual information elements of the contextual information for relevance to the handwritten text. When returning the contextual information to the information handling system, the back end service may also return rankings of contextual information elements of the contextual information. Thus, the information handling system may receive rankings for contextual information elements of the contextual information in addition to the contextual information. When displaying received contextual information, the information handling system may display the contextual information based on the received rankings. For example, if space available for display of contextual information is limited, the information handling system may limit display of contextual information elements to elements with high rankings while refraining from displaying contextual information elements with low rankings. Thus, information that is most likely to be of use to a user may be prioritized.

An information handling system may include processor and a memory configured to perform the steps described herein. Alternatively or additionally, a computer program product may include a non-transitory computer-readable medium comprising instructions to cause a processor to perform the steps described herein.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application. The teachings can also be used in other applications and with several different types of architectures.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
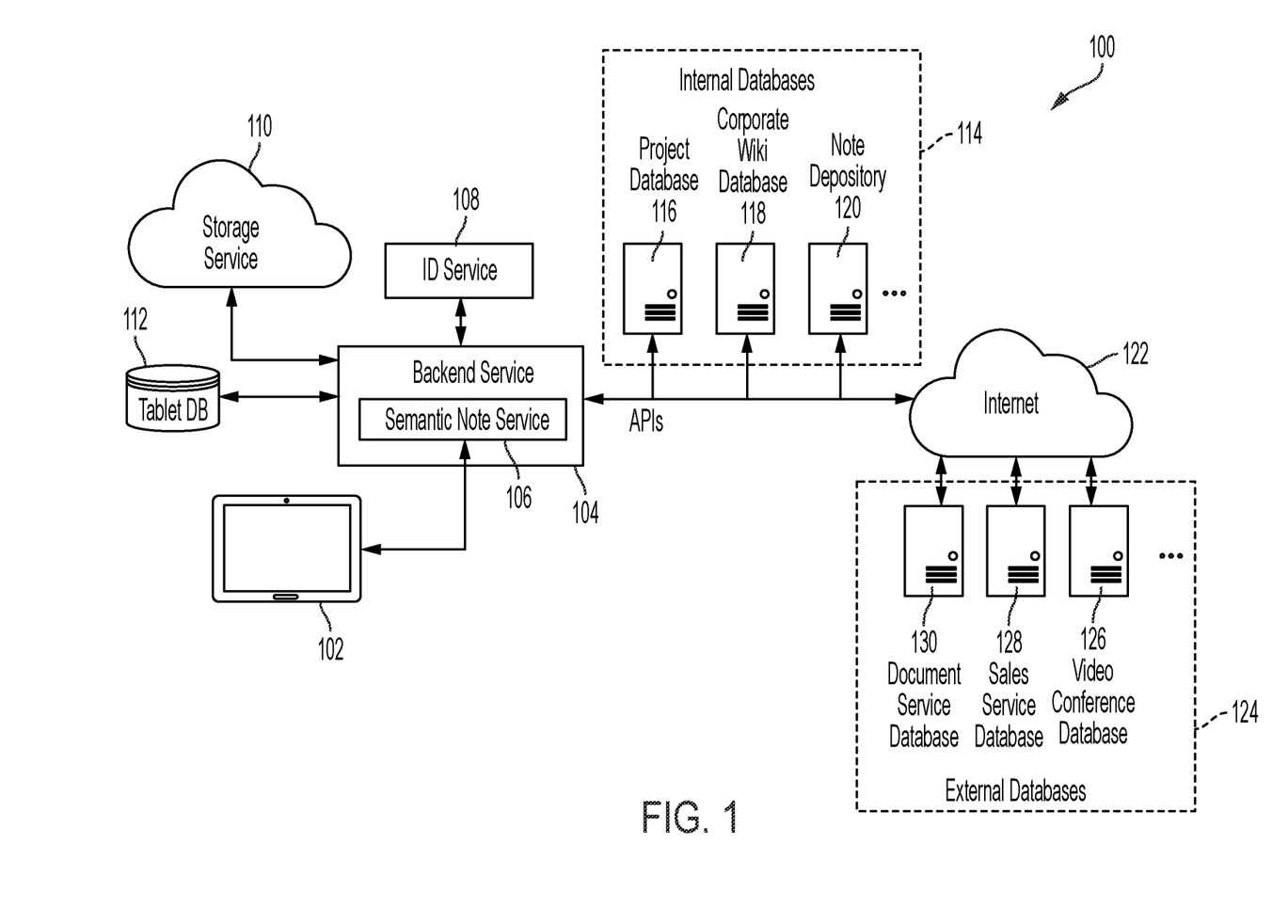
FIG. 1 is an illustration of an example system for intelligent automated note annotation according to some embodiments of the disclosure.

A system for intelligent automated note annotation may detect handwritten terms entered by a user of an information handling system and may aggregate information related to the handwritten terms from a plurality of sources in order to provide the user with contextual information related to the handwritten terms. An example system 100 for intelligent automated note annotation is shown in FIG. 1. An information handling system 102 may be operated by a user to take notes. For example, one or more applications, such as note taking and/or word processing applications may be executed by a user to generate notes, such as document, presentation, or other files including handwritten text. The information handling system 102 may, for example, be a tablet, laptop, smart phone, or other information handling system. The information handling system may have an interface, such as a touch screen, for receiving handwritten input. For example, an interface of the information handling system 102 for receiving handwritten input may be used by a user to take handwritten notes in one or more note taking applications, such as word processing or note taking applications. The application(s) may communicate with a background service of the information handling system 102 to request contextual information related to handwritten terms written by the user from one or more external sources. For example, a user may input an indicator, such as a gesture, indicating that contextual information should be requested and displayed for a handwritten term. The background service executed by the information handling system 102 may detect the indicator and the handwritten text and may request contextual information related to the handwritten text from one or more external sources.

The application(s) and/or background service of the information handling system 102 may communicate with a backend service 104 to request contextual information related to handwritten text entered by a user. For example, when the information handling system 102 detects handwritten text and a gesture indicating that contextual information related to the handwritten text should be retrieved, the information handling system 102 may transmit a request to the backend service 104 for contextual information related to the handwritten text. The request may, for example, be transmitted by a background service of the information handling system 102. The backend service 104 may be a service run on a remote server for receiving contextual information requests and may include a semantic note service 106 for receiving and processing contextual information requests. The backend service 104 may communicate with a tablet database 112 to retrieve information related to the information handling system 102. In some embodiments, the backend service 104 may request contextual information related to the handwritten text from the tablet database 112, such as contextual information related to personal notes generated by the user and saved on the tablet database 112. For example, the tablet database 112 may store multiple notes or documents generated by the information handling system 102, and the backend service 104 may request names, descriptions, tags, file locations, links, and other information related to the stored notes and/or documents and the handwritten text. Information related to stored notes that correspond to the handwritten text, such as notes with titles or one or more tags that match one or more words of the handwritten text, may be requested by the backend service 104. The backend service may also connect to a cloud storage service 110 that may include documents and other information and may retrieve contextual information related to the handwritten text from the storage service in a similar manner.

The backend service 104 may also communicate with an identification service 108. The identification service 108 may, for example, include user identification information, such as user IDs, passwords, tokens, and other account identifiers, for one or more external services from which contextual information may be retrieved. For example, when initializing the intelligent automated document annotation functionality on the information handling system 102, a user may enter user identification details, such as usernames, and passwords for services from which contextual information for use by the intelligent automated document annotation system may be retrieved. For example, a user, through an application executed by the information handling system 102, such as through a web portal displayed by a web browser of the information handling system 102, may make a service request to a front-end website portal of the intelligent note annotation system requesting that one or more services be added as sources of contextual information for intelligent note annotation. In some embodiments, the front-end website portal may be displayed on a display of the information handling system 102. The front-end website portal may then request authentication from the backend service 104, and the backend service may communicate with one or more authorization and/or token servers of the requested services. The one or more authorization and/or token servers of the requested services may transmit a request for authorization to the front-end website portal. The front-end website portal may present the request for authorization to a user. The user may enter authorization, such as a username or identifier, a password, and/or other authorization information granting access authorization. The front-end website portal may then transmit the information granting access authorization to the one or more authorization and/or token servers. The servers may provide the backend service 104 with an authorization code. The backend service 104 may then provide the server(s) with the authorization code(s), and the servers may provide the backend service 104 with one or more access tokens for accessing the services for retrieval of contextual information. The backend service 104 may periodically refresh the access token(s) to maintain access to the services. Thus, when configuring operation of the system 100, a user may authorize the backend service 104 to retrieve contextual information from multiple sources, including internal enterprise databases operated by an organization of which the user is a member and external databases for services which the user utilizes.

The backend service 104 may, in some embodiments, be operated on an internal enterprise server. In some embodiments, the backend service 104 may request contextual information related to handwritten text from one or more internal service databases 114. For example, internal service databases 114 may be maintained on an internal network of an organization, such as in an enterprise data center. The backend service 104 may communicate with the internal service databases 114 using one or more APIs to request and receive contextual information.

As one example, internal databases 114 may include an issue and project tracking database 116, such as a Jira database. The issue and project tracking database 116 may include a plurality of open issues and/or projects tagged with relevant identifiers such as dates of creation, issue/project details, individuals that created the projects or issues, individuals that are responsible for the projects or issues, and other information. In requesting contextual information from the issue and project tracking database 116, the backend service 104 may request contextual information related to projects or issues that match one or more words of the handwritten text. For example, the backend service may request issue and/or project logs with titles, dates, times, tags, employees, or other identifiers that correspond to one or more words of the handwritten text. The issue and project tracking database 116 may then return contextual information related to issues and/or projects that correspond to the handwritten text to the backend service 104, and the backend service 104 may return the contextual information to the information handling system 102 for display to a user.

As another example, the backend service 104 may request contextual information from a corporate wiki database 118, such as a confluence database. For example, if the handwritten text includes a name of an individual, the backend service 104 may request contextual information related to the named individual from the corporate wiki database 118. Such information may, for example, include a title of the individual, information specifying direct reports of the individual, a manager of the individual, an email address of the individual, a phone number of the individual, an organizational chart including the individual, an image of the individual, a location of the individual, and other information related to the individual. The contextual information may be returned to the backend service 104, and the backend service 104 may return the contextual information to the information handling system 102 for display to a user.

As a further example, the backend service 104 may request contextual information from an enterprise note depository 120. For example, handwritten notes created by users of devices with input interfaces configured to accept handwriting may be stored in a corporate note depository 120. In particular, the note depository 120 may store handwritten notes generated by users of information handling systems such as the information handling system 102. The backend service 104 may request contextual information of notes that correspond to one or more handwritten terms from the note depository 120. For example, the backend service 104 may request contextual information of notes that are tagged with tags including one or more of the handwritten terms, that include one or more of the handwritten terms in their titles, and/or that otherwise correspond to one or more of the handwritten terms. The note depository 120 may return contextual information of the notes, such as note titles, tags, dates and/or times of creations, creators, edit histories, locations, links, file types, descriptions, and other note contextual information, to the backend service 104, and the backend service 104 may return the contextual information to the information handling system 102 for display to a user. In some embodiments, only contextual information relating to notes to which the user of the information handling system 102 has access permissions may be returned.

In some embodiments, the backend service 104 may request contextual information related to handwritten text from one or more external service databases 124 through the internet 122. The backend service 104 may communicate with the external service databases 124 using one or more APIs to request and receive contextual information.

As one example, the external databases 124 may include a document service database 130, such as a Microsoft Graph database. Contextual information related to the handwritten text retrieved from the document service database may include contextual information related to messaging conversations, documents, emails, spreadsheets, presentations, and other files. For example, if the handwritten text includes a name of an individual, the backend service 104 may receive information related to one or more messaging or email conversations with the individual, such as conversation text, timing of conversations, locations of the conversations, and/or links to conversations. As another example, the backend service 104 may request contextual information of files, such as documents or emails, that are tagged with tags including one or more of the handwritten terms, that include one or more of the handwritten terms in their titles, and that otherwise correspond to one or more of the handwritten terms. The document service database 130 may return contextual information of the files, such as file names, tags, dates and/or times of creations, creators, edit histories, locations, links, file types, descriptions, and other file contextual information, to the backend service 104, and the backend service 104 may return the contextual information to the information handling system 102 for display to a user. As another example, contextual information related to handwritten text may be requested from a sales service database 128, such as a Salesforce database, and a video conference database 126, such as a Zoom database, among other external databases.

Thus, the backend service 104 may request and aggregate contextual information from a variety of sources. In some embodiments, the backend service may rank received contextual information according to relevance to the handwritten text entered by the user. For example, contextual information that more closely matches the handwritten text entered by the user may be ranked higher than contextual information that is only tangentially related to the handwritten text that is entered by the user. For example, if handwritten text includes a name of an individual and a search term, emails including the search term that were generated by or received by the named individual may be ranked higher than emails that were not generated by or received by the named individual.

Handwritten text for which contextual information is requested and received may include a variety of terms and identifiers, such as names of individuals, dates, times, words, and other terms and identifiers. In some embodiments, the information handling system may monitor for specific gestures identifying specific kinds of handwritten text for requesting contextual information. For example, a first gesture, such as drawing of an "@" symbol may indicate to the information handling system that text near or following the symbol should be searched as a name, and contextual information corresponding to the name should be returned. As another example, a second gesture, such as single or double underlining may indicate to the information handling system that text near or following the symbol should be searched as a term, and contextual information corresponding to the term should be returned. Other example gestures may include double tapping text, tapping and holding text, and otherwise indicating that contextual information related to the handwritten text should be returned. In some embodiments, different gestures may indicate that different databases or services should be queried for contextual information.

Figure 2:
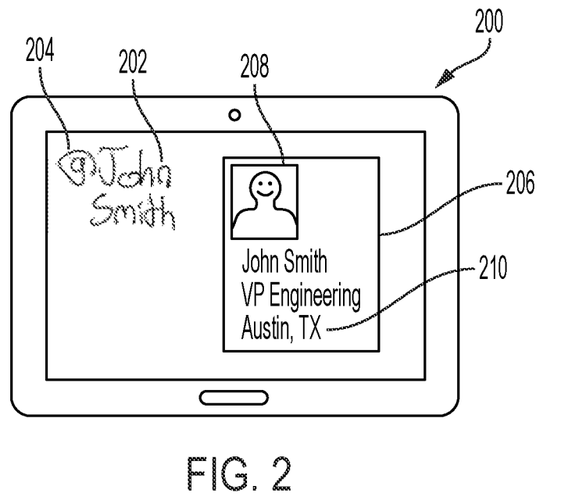
FIG. 2 is an illustration of an example note annotation based on a handwritten name according to some embodiments of the disclosure.

As shown in the example information handling system 200 of FIG. 2, a user may handwrite a name 202 of an individual. For example, a user may use a finger or stylus to handwrite a name 202 of an individual on a touch display of the information handling system 200. A user may also input a gesture 204 indicating that contextual information corresponding to the handwritten name should be received. The gesture 204 may, for example, be a character, such handwriting an "@" symbol via the input interface. In some embodiments, the gesture 204 may indicate the type of search that should be performed on the handwritten text. For example, the handwritten "@" symbol may indicate that text following or near the symbol should be searched as a name. Contextual information corresponding to the name received by the information handling system 200 from a backend service may include an image of the individual, a title of the individual, a manager of the individual, a department of the individual, a location of the individual, an organizational chart including the individual, a list of documents and/or notes generated by the individual, an email address of the individual, a phone number of the individual, and other contextual information corresponding to the individual. The information handling system 200 may overlay the contextual information 206 on an application window including the handwritten text. For example, in some embodiments the contextual information may appear in an overlay or pop-up window adjacent to the handwritten name 202. For example, an image 208 of the individual specified by the handwritten name 202 and other contextual information 210 about the individual may be overlaid on the application in which the handwritten text was input or may appear in a pop-up window adjacent to the handwritten name 202. The contextual information 210 may also include relevant information recorded by the user about the named individual.

Figure 3:
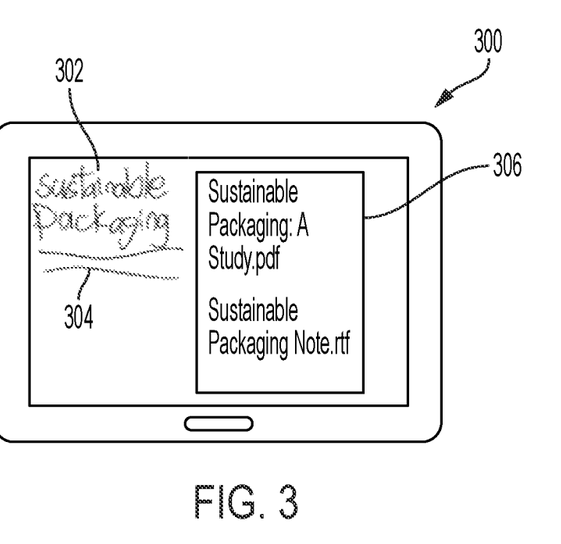
FIG. 3 is an illustration of an example note annotation based on a handwritten term according to some embodiments of the disclosure.

As shown in the example information handling system 300 of FIG. 3, a user may handwrite a term 302. The user may also input a gesture 304 indicating that contextual information corresponding to the handwritten term 302 should be retrieved. For example, the user may double underline the term. In some embodiments, the gesture 304 may indicate the type of search that should be performed on the handwritten text, such as a search for contextual information related to a term. Contextual information corresponding to the term received by the information handling system 300 from a backend service may include contextual information related to files corresponding to the term, such as titles of files, generation dates of files, locations of files, links to files, names of users that generated and/or edited the files, and other contextual information relating to the files. The information handling system 300 may overlay the contextual information 306 on an application window including the handwritten text. For example, in some embodiments the contextual information may be included in an overlay or pop-up window adjacent to the handwritten text 302. For example, contextual information 306 including one or more links to files related to the handwritten term 304 may be displayed. For example, contextual information related to the term 302, sustainable packaging, may be displayed, such as recent emails relating to sustainable packaging, issue or project tickets, such as Jira tickets, related to sustainable packaging, a corporate wiki page related to sustainable packaging, and other notes related to sustainable packaging retrieved from a corporate note depository. For example links to such contextual information may be displayed. Thus, contextual information relating to a term may be automatically retrieved from one or more external sources and presented to a user.

In some embodiments, multiple different types of handwritten text may be combined in a single or multiple search requests. For example, a user may include a name, a date, and/or a term in handwritten text and may input one or more gestures indicating that a search for contextual information related to the handwritten text should be performed. Contextual information relating to one or more of the name, the date, and the term may be retrieved. For example, details about the named individual may be retrieved, information about files related to the term may be retrieved, and information about files generated on or near the handwritten date may be retrieved. In some embodiments, returned results may be ranked based on their correspondence to the plurality of terms. For example, contextual information that corresponds to the name, the date, and the term may be ranked higher than contextual information that corresponds to only the name, or the name and the date. A file generated by the named individual, tagged with the handwritten term, and generated on or near the handwritten date may, for example, be ranked higher than an email that is not associated with the defined term and was generated several months prior to the handwritten date.

Figure 4:
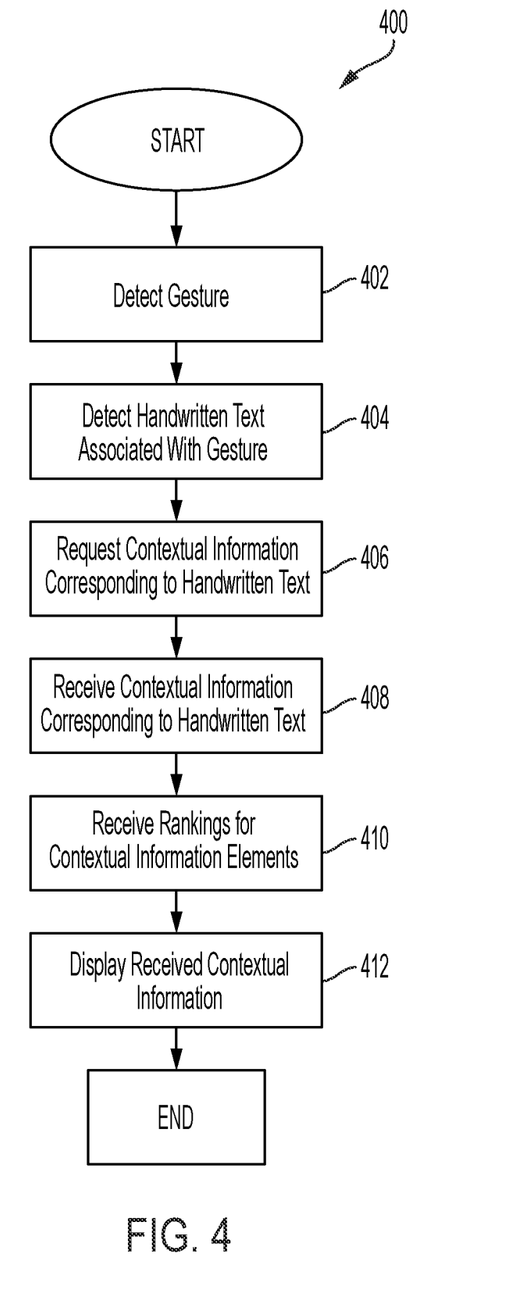
FIG. 4 is a flow chart diagram of an example method for provision of contextual information according to some embodiments of the disclosure.

An information handling system operated by a user, such as a tablet or notebook computer, may request contextual information corresponding to handwritten text entered by the user and may display the contextual information for the user. An example method 400 for retrieval and display of contextual information is shown in FIG. 4. The method 400 may begin, at step 402, with detection of a gesture. The gesture may correspond to a request for contextual information The gesture may, for example, include handwritten input, such as handwritten input of an "@" symbol, underlining text, double underlining text, or other handwritten input. As another example, the gesture may include tapping text, double tapping text, tapping and holding a finger or stylus on the text, or other input. In some embodiments, a gesture indicating that contextual information should be retrieved may cause a user prompt to appear, informing the user that contextual information is available and/or inquiring as to whether the user would like to view the contextual information.

At step 404, the information handling system may detect handwritten text that is associated with a gesture. For example, if the gesture is a handwritten input, the information handling system may detect text following or near the handwritten input. For example, if the gesture is underlining, the information handling system may detect the handwritten text that is underlined. As another example, if the text is double tapped, the information handling system may detect handwritten text near the double tap location. In some embodiments, detection of handwritten text may include performing handwriting recognition on the handwritten text to determine the text that has been handwritten.

At step 406, the information handling system may request contextual information corresponding to the handwritten text. For example, the information handling system may transmit a request for contextual information related to the handwritten text to a backend service operated on a remote server. The remote server operating the backend service may, for example, be an external information handling system. In some embodiments, the request may be transmitted by a background service operated by the information handling system. The request may include, for example, details specifying the handwritten text that has been detected and information identifying one or more external databases from which contextual information corresponding to the handwritten text should be retrieved. Alternatively or additionally, the request may include one or more parameters related to the handwritten text to be used in searching for relevant contextual information, such as words, times, and/or dates included in the handwritten text. For example, if the handwritten text includes a time frame, such as "last week," contextual information generated or altered in the last week, such as documents or notes generated in the last week, or contextual information generated or altered around one week previously may be retrieved. In some embodiments, the backend service may request contextual information from one or more service APIs.

At step 408, the information handling system may receive contextual information corresponding to the handwritten text. For example, a backend service may retrieve contextual information corresponding to the handwritten text from one or more databases, such as internal enterprise databases and external databases. The backend service may retrieve contextual information corresponding to the handwritten text from one or more service databases via one or more APIs and may pass the received contextual information on to the information handling system.

In some embodiments, the information handling system may, at step 410, receive rankings elements of the contextual information received. For example, the backend service may rank contextual information elements according to relevance to the handwritten text. Contextual information elements that are more relevant to the handwritten text may receive higher rankings, while less relevant contextual information elements may receive lower rankings. The backend service may transmit the rankings to the information handling system along with the contextual information. In some embodiments, the backend service may perform filtering of the contextual information elements according to the ranking, transmitting only elements that meet a predetermined relevance threshold to the information handling system.

At step 412, the information handling system may display the received contextual information. For example, the information handling system may overlay some or all of the received contextual information on an application window of the application in which the handwritten text was detected. The contextual information may be displayed adjacent to the handwritten text, such as overlaid on an application window and/or displayed in a pop up, indicating the handwritten text to which the contextual information corresponds and annotating the note or document including the handwritten text. In some embodiments, the contextual information may be incorporated into the note or document including the handwritten text. In some embodiments, the information handling system may filter the received contextual information, displaying the contextual information according to received rankings. For example, the information handling system may have limited space for display of contextual information and may display highly ranked contextual information while refraining from displaying lower ranked contextual information. In some embodiments, an option may be displayed for selection by a user for display of additional contextual information. Thus, contextual information corresponding to handwritten text may automatically be retrieved and displayed for a user to enhance a user experience.

Figure 5:
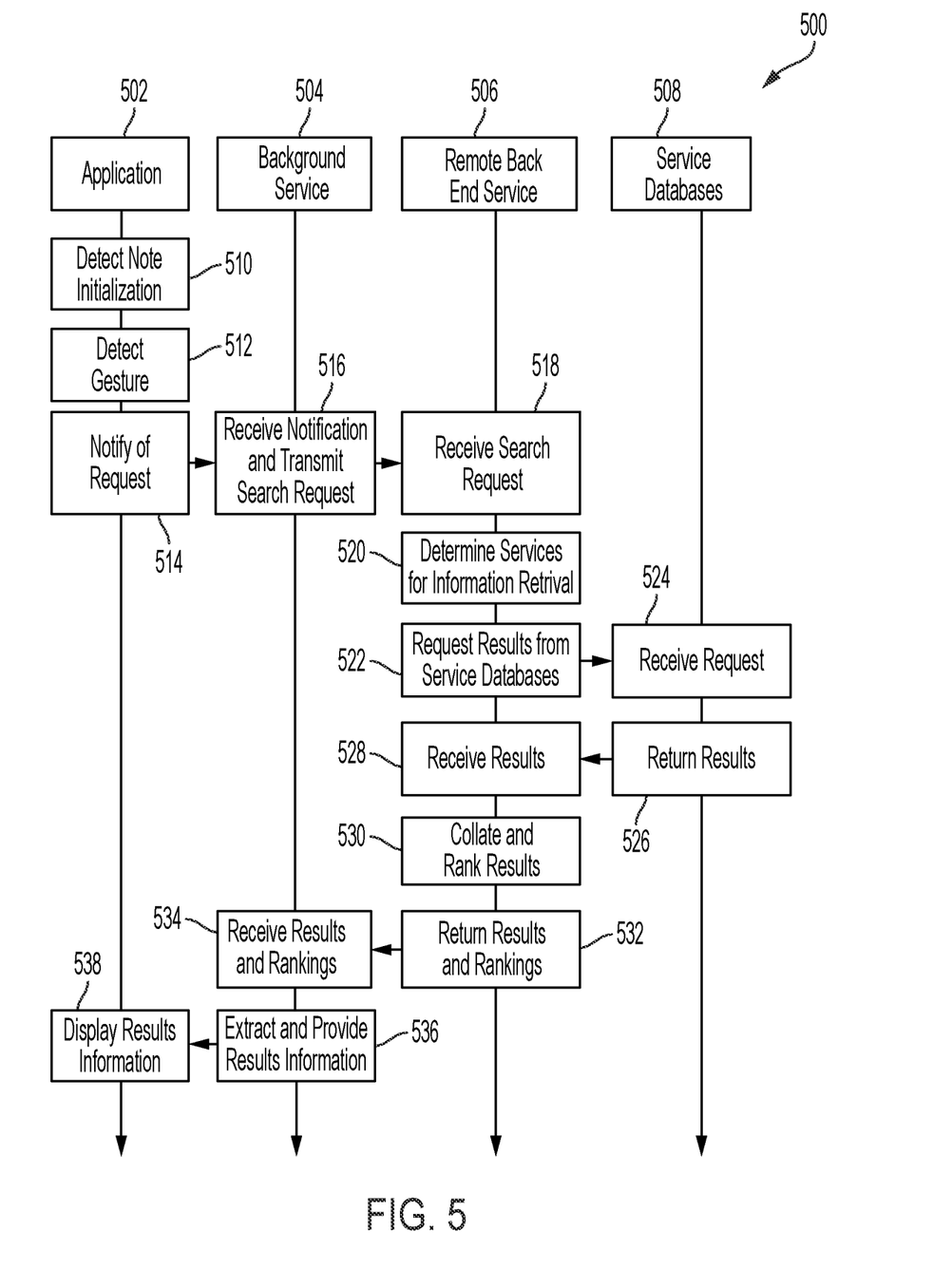
FIG. 5 is a process flow diagram of an example method for provision of contextual information according to some embodiments of the disclosure.

An example process flow diagram 500 for intelligent automated document annotation is shown in FIG. 5. An application 502 executed by a first information handling system, such as a tablet or laptop computer, may communicate with a background service 504. In some embodiments the background service 504 may be operated by the first information handling system. The background service 504 may communicate with a remote back end service 506, such as a backend service run on one or more enterprise servers. The remote backend service 506 may communicate with one or more service databases 508, such as internal or external service databases. For example, the remote backend service 506 may communicate with one or more service databases 508 via one or more APIs for the services.

The application 502 executed by the information handling system may, at step 510, detect initialization of a note. For example, a user may initialize the application 502, may open a new note or document for note taking, and may begin entering handwritten text. For example, a user may enter a meeting, may open a note on a note application of a tablet of the user for taking notes during a meeting, and may begin taking notes.

The application 502 may, at step 512, detect a gesture. The gesture may be a contextual information request gesture. The gesture may, for example, include underlining of handwritten text, double underlining of handwritten text, tapping handwritten text, double tapping handwritten text, handwriting a character, such as an "@" symbol, before or near handwritten text, inputting of a date, or other gesture indicating that contextual information for handwritten text should be retrieved. Detection of the gesture may also include determination of handwritten text associated with the request gesture. For example, if the gesture is underlining of text, detection of the gesture may include determining what handwritten text is underlined. In some embodiments, such determination may include performing handwriting recognition on the handwritten text to determine the text included in the handwritten text.

The application may, at step 514, notify a background service 504 of the information handling system of the request. For example, the application may transmit a topic lookup request to the background service detailing the terms for which a contextual information search should be performed. For example, if the gesture indicated a handwritten term, the application 502 may notify the background service 504 that a search for contextual information corresponding to the term should be performed, such as a search of document topics, note titles, and/or names. If the gesture indicated a handwritten name, the application 502 may notify the background service 504 that a search of contextual information corresponding to the name should be performed. If the gesture included a date, the application 502 may notify the background service that a search for contextual information corresponding to the date, such as files created or edited on the date, should be performed. In some embodiments, different detected gestures may indicate different kinds of searches should be performed.

At step 516, the background service 504 may receive the notification of the request for contextual information and may transmit a search request to the remote backend service 506. The search request may, for example, include information related to the handwritten text, such as information detailing the contents of the handwritten text. In some embodiments, the transmitted request may include an API request transmitted to the backend service 506, such as a GraphQL API request including a topic to be searched, a document or note title to be searched, a name to be searched, and/or other information.

The remote backend service 506 may receive the search request at step 518. At step 520, the remote backend service may determine one or more services from which contextual information should be received. In some embodiments, the services may be specified in the request received from the background service 504. In other embodiments, the backend service 506 may determine the services for contextual information retrieval based on one or more characteristics of the handwritten text that prompted the search request, such as text included in the handwritten text. In still other embodiments, the backend service 506 may automatically request contextual information from all available service databases.

At step 522, the backend service may request contextual information corresponding the handwritten text from one or more service databases 508. The service databases 508 may include internal document, issue and project, file storage, note depository, corporate wiki, and other data bases. The service databases 508 may also include external databases, such as document service databases, sales service databases, videoconference service databases, and other service databases. The remote backend service 506 may transmit the request for contextual information to the service databases 508 via one or more APIs for interfacing with the service databases 508. For example, the remote backend service 506 may perform a get function requesting contextual information corresponding to the handwritten text from the service databases 508. As one example, the remote backend service 506 may request contextual information corresponding to a handwritten term, such as names of individuals, files having titles including or tagged with the handwritten term, organizational charts associated with the handwritten term, and other contextual information, from a corporate wiki database of the service databases 508. As another example, the remote backend service 506 may request contextual information corresponding to a handwritten term, such as project or issue titles, descriptions, dates, file locations, and other contextual information, from a project and issue database of the service databases 508. As another example, the remote backend service 506 may request contextual information corresponding to a handwritten term, such as emails including or tagged with the handwritten term, from a document service database of the service databases 508. As another example, the remote backend service may request contextual information corresponding to a handwritten name, such as emails or links to emails sent by and/or received from the individual corresponding to the handwritten name, from a document service database of the service databases 508. The contextual information may be requested from the service databases 508 via one or more APIs.

At step 524, the service databases 508 may receive the request from the remote backend service 506. At step 526, the service databases 508 may return the contextual information corresponding to the handwritten text to the remote backend service 506, and, at step 528, the remote backend service 506 may receive the results.

At step 530, the remote backend service 506 may collate and rank the contextual information received from the service databases 508. For example, the backend service 506 may rank received contextual information elements according to relevance to one or more terms of the handwritten text for which the contextual information was requested. For example, contextual information elements, such as issue or project files from a project database, with an issue or project assignee or reporter name equal to a name included in the handwritten text may be ranked higher than those without. As another example, contextual information elements, such as issue or project files from a project database, including a topic or title equal to a term included in the handwritten text may be ranked higher than those without.

At step 532, the remote backend service 506 may return the contextual information and rankings of contextual information elements, and, at step 534, the background service of the information handling system may receive the contextual information and the rankings of the contextual information elements. The contextual information and rankings may, for example, be returned in the form of a GraphQL response, with results organized according to a service database from which the contextual information was received.

At step 536, the background service 504 may extract the contextual information and, in some embodiments, rankings from the received return and may provide the results information to the application 502. In some embodiments, the background service 504 may provide a subset of the extracted contextual information elements to the application 502 based on the received rankings of the contextual information elements. For example, the background service 504 may only provide contextual information elements with a ranking higher than a predetermined threshold to the application 502 for display to a user. In some embodiments, the background service may provide all contextual information elements and rankings to the application 502 and the application may select which contextual information elements to display for the user.

At step 538, the application 502 may receive the contextual information results from the background service 504 and may display the contextual information results for the user. The application 502 may, for example, overlay the contextual information on an application window of the application near the handwritten text or may display the contextual information in a pop-up near the handwritten text. In some embodiments, the application 502 may select a subset of contextual information elements of the contextual information results to display for a user based on the received rankings. Thus, contextual information may be automatically aggregated, filtered, and displayed of a user.

The flow chart and process flow diagrams of FIGS. 4-5 are generally set forth as logical flow chart and/or process flow diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for providing contextual information to a user of an information handling system, comprising:
   detecting, by an application of the information handling system, handwritten text associated with a gesture;
   determining, by the information handling system in response to detection of the gesture, one or more databases of a plurality of databases from which contextual information will be requested based, at least in part, on the handwritten text associated with the gesture;
   requesting, by the information handling system from a remote service, contextual information corresponding to the handwritten text from the one or more databases by transmitting a request to the remote service for the contextual information, the request comprising an indication of the one or more databases determined based on the handwritten text;
   receiving, by the information handling system from the remote service in response to the request, contextual information retrieved from the one or more databases corresponding to the handwritten text; and
   displaying, by the application on a display of the information handling system, the received contextual information.

2. The method of claim 1, wherein the handwritten text comprises a name of an individual and wherein the received contextual information comprises contextual information related to at least one of:
   emails generated by or received by the individual;
   messaging conversations generated by or received by the individual;
   documents generated or edited by the individual; or
   a corporate profile of the individual.

3. The method of claim 1, wherein the handwritten text comprises a term, and wherein the received contextual information comprises at least one of:
   one or more links to one or more documents stored in a database that are tagged with the term;
   one or more links to one or more web documents that are tagged with the term;
   one or more links to one or more web pages that are tagged with the term;
   contextual information describing one or more individuals tagged as experts or collaborators with expertise in the term; or
   one or more links to one or more messaging conversations tagged with the term.

4. The method of claim 1, wherein the handwritten text comprises at least one of a date or a time frame, and wherein the received contextual information comprises one or more links to one or more documents associated with the date or time frame that are stored in a database.

5. The method of claim 1, wherein the steps of requesting and receiving are performed by a background service executed by the information handling system, and wherein the step of displaying the received contextual information comprises overlaying the received contextual information on an application window, of the application, displaying the handwritten text, and wherein only a subset of the contextual information is provided by the background service to the application for overlaying on the application window, the subset of the contextual information being less than all of the contextual information.

6. The method of claim 1, wherein receiving contextual information comprises receiving contextual information via one or more application programming interfaces (APIs).

7. The method of claim 1, further comprising:
receiving a plurality of rankings for a plurality of contextual information elements of the contextual information received by the information handling system,
wherein displaying the received contextual information comprises displaying the received contextual information based, at least in part, on the received plurality of rankings.

8. An information handling system, comprising:
a processor; and
a memory,
wherein the processor is configured to perform steps comprising:
detecting, by an application, handwritten text associated with a gesture;
determining, in response to detection of the gesture, one or more databases of a plurality of databases from which contextual information will be requested based, at least in part, on the handwritten text associated with the gesture;
requesting, from a remote service, contextual information corresponding to the handwritten text from the one or more databases by transmitting a request to the remote service for the contextual information, the request comprising an indication of the one or more databases;
receiving, from the remote service, contextual information from the one or more databases in response to the request, the contextual information corresponding to the handwritten text; and
displaying, by the application on a display of the information handling system, the received contextual information.

9. The information handling system of claim 8, wherein the handwritten text comprises a name of an individual and wherein the received contextual information comprises contextual information related to at least one of:
emails generated by or received by the individual;
messaging conversations generated by or received by the individual;
documents generated or edited by the individual; or
a corporate profile of the individual.

10. The information handling system of claim 8, wherein the handwritten text comprises a term, and wherein the received contextual information comprises at least one of:
one or more links to one or more documents stored in a database that are tagged with the term;
one or more links to one or more web documents that are tagged with the term;
one or more links to one or more web pages that are tagged with the term;
contextual information describing one or more individuals tagged as experts or collaborators with expertise in the term; or
one or more links to one or more messaging conversations tagged with the term.

11. The information handling system of claim 8, wherein the handwritten text comprises at least one of a date or a time frame, and wherein the received contextual information comprises one or more links to one or more documents associated with the date or time frame that are stored in a database.

12. The information handling system of claim 8, wherein the steps of requesting and receiving are performed by a background service executed by the information handling system, wherein the step of displaying the received contextual information comprises overlaying the received contextual information on an application window, of the application, displaying the handwritten text, and wherein only a subset of the contextual information is provided by the background service to the application for overlaying on the application window, the subset of the contextual information being less than all of the contextual information.

13. The information handling system of claim 8, wherein receiving contextual information comprises receiving contextual information via one or more application programming interfaces (APIs).

14. The information handling system of claim 8, wherein the processor is further configured to perform steps comprising:
receiving a plurality of rankings for a plurality of contextual information elements of the contextual information received by the information handling system,
wherein displaying the received contextual information comprises displaying the received contextual information based, at least in part, on the received plurality of rankings.

15. A computer program product, comprising:
a non-transitory computer readable medium, wherein the non-transitory computer readable medium comprises instructions for causing an information handling system to perform steps comprising:
detecting, by an application, handwritten text associated with a gesture;
determining, by the information handling system in response to detection of the gesture, one or more databases of a plurality of databases from which contextual information will be requested based, at least in part, on the handwritten text associated with the gesture;
requesting, from a remote service, contextual information corresponding to the handwritten text from the one or more databases by transmitting a request to the remote service for the contextual information, the request comprising an indication of the one or more databases;
receiving, from the remote service, contextual information from the one or more databases in response to the request, the contextual information corresponding to the handwritten text; and
displaying, by the application on a display of the information handling system, the received contextual information.

16. The computer program product of claim 15, wherein the handwritten text comprises a name of an individual and wherein the received contextual information comprises contextual information related to at least one of:
emails generated by or received by the individual;
messaging conversations generated by or received by the individual;
documents generated or edited by the individual; or
a corporate profile of the individual.

17. The computer program product of claim 15, wherein the handwritten text comprises a term, and wherein the received contextual information comprises at least one of:
one or more links to one or more documents stored in a database that are tagged with the term;
one or more links to one or more web documents that are tagged with the term;
one or more links to one or more web pages that are tagged with the term;

contextual information describing one or more individuals tagged as experts or collaborators with expertise in the term; or one or more links to one or more messaging conversations tagged with the term.

18. The computer program product of claim 15, wherein the handwritten text comprises at least one of a date or a time frame, and wherein the received contextual information comprises one or more links to one or more documents associated with the date or time frame that are stored in a database.

19. The computer program product of claim 15, wherein receiving contextual information comprises receiving contextual information via one or more application programming interfaces (APIs).

20. The computer program product of claim 15, wherein the non-transitory computer-readable medium comprises instructions for causing an information handling system to perform steps further comprising:

receiving a plurality of rankings for a plurality of contextual information elements of the contextual information received by the information handling system, wherein displaying the received contextual information comprises displaying the received contextual information based, at least in part, on the received plurality of rankings.

* * * * *